United States Patent Office 2,843,342
Patented July 15, 1958

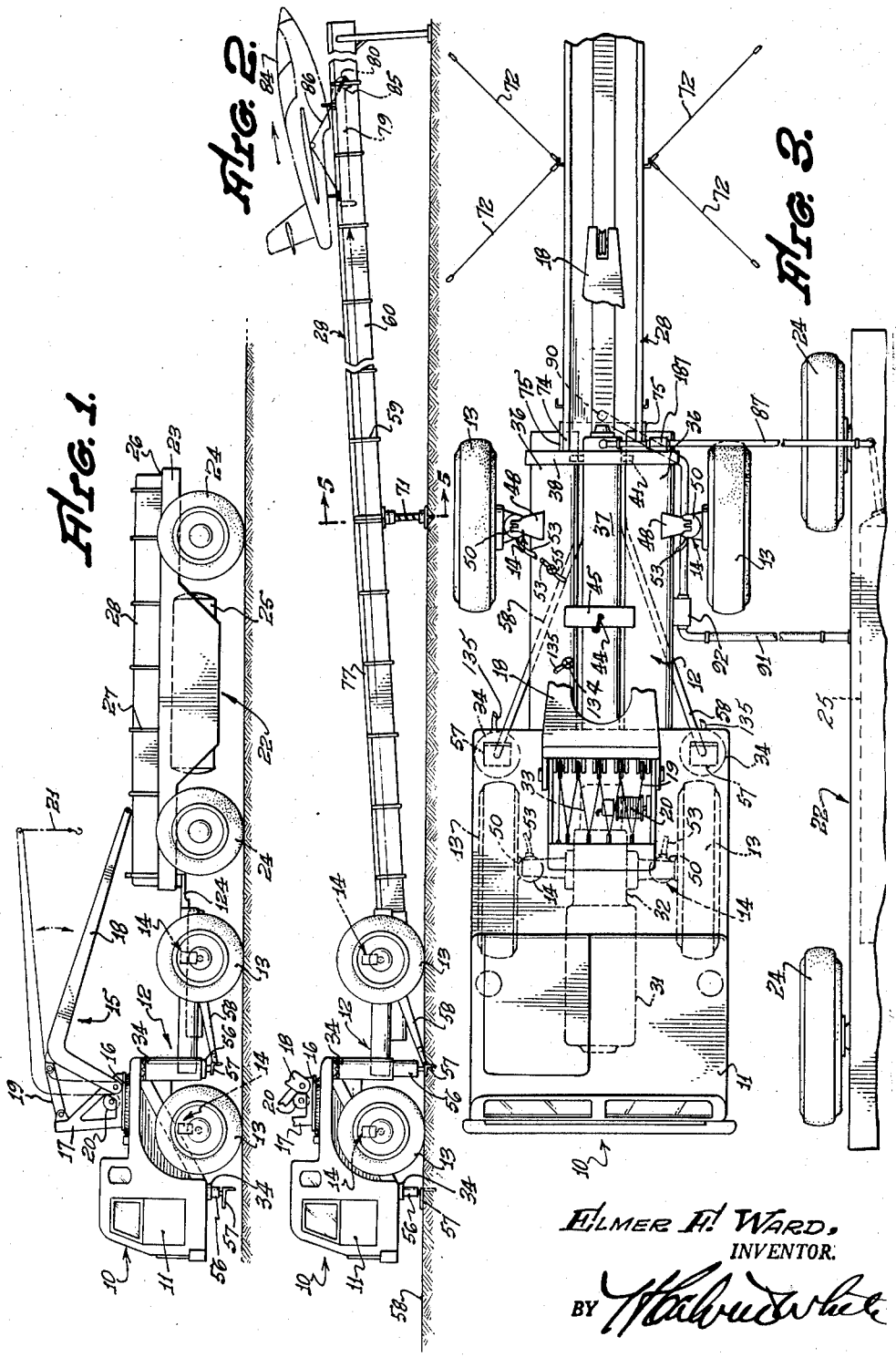

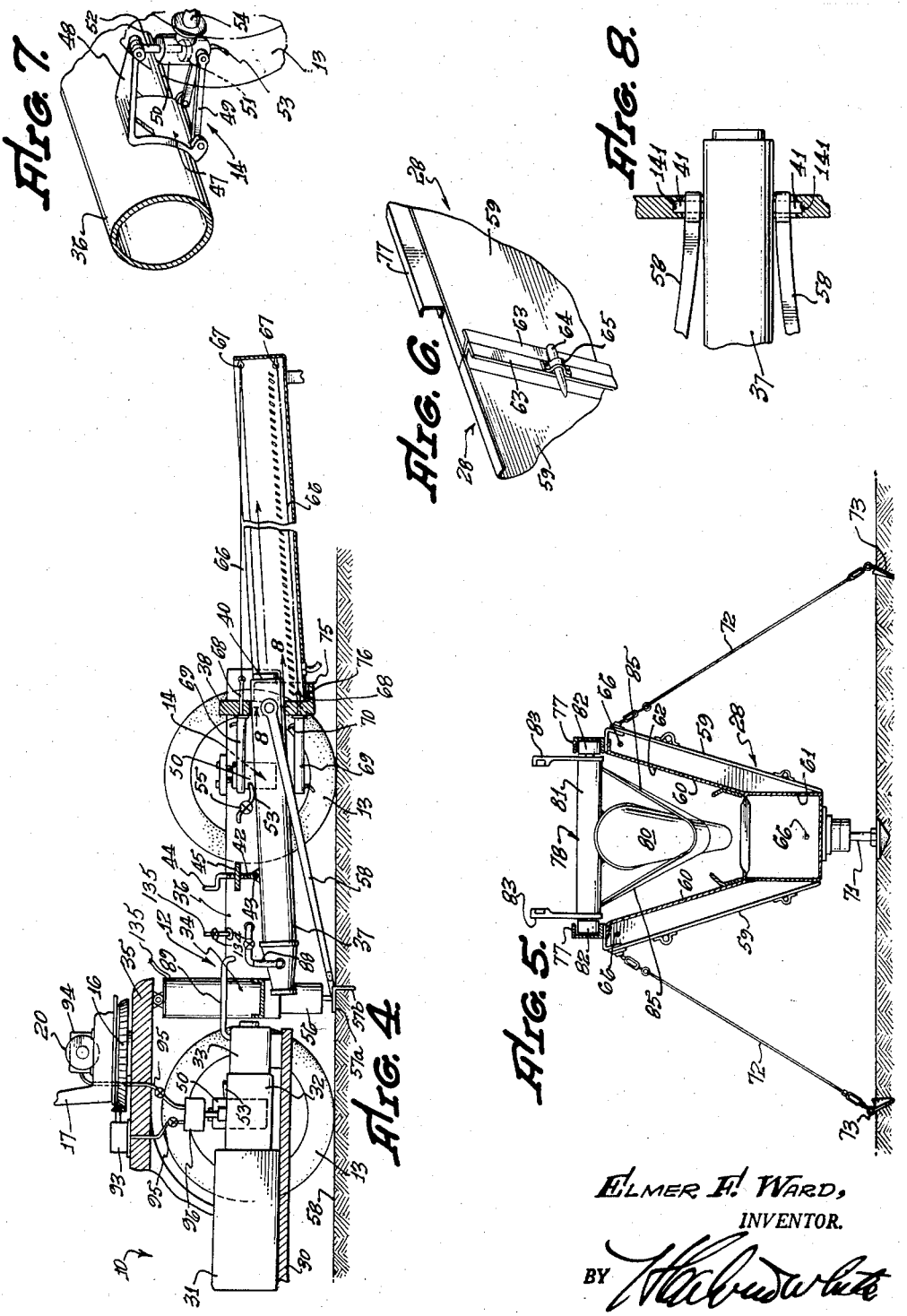

2,843,342

MOBILE HYDRAULIC CATAPULTING APPARATUS

Elmer F. Ward, Pasadena, Calif., assignor to Task Corporation, Pasadena, Calif., a corporation of California Application September 23, 1955, Serial No. 536,133

14 Claims. (Cl. 244—63)

This invention relates generally to apparatus for catapulting or launching aircraft from stationary position to self-sustaining flight speeds, and more specifically concerns the provision of novel hydraulic catapulting equipment designed for a high degree of strategic and tactical mobility and characterized by adaptability for quick transportation and ready emplacement for launching aerial weapons and aircraft under combat conditions.

The present invention incorporates the novel methods of hydraulically catapulting an aircraft as disclosed in my co-pending application Number 536,478, filed September 26, 1955 entitled "Hydraulic Impulse Catapult" making use of those methods in the highly original mobile catapulting equipment to be described. Prior to discussing such equipment, reference will first be made to the problems surrounding the use of heavily loaded modern aircraft under tactical conditions, insofar as those problems concern getting the aircraft into the air. Generally speaking, the use of military aircraft, and especially jet engine powered craft, is limited to those areas where large-size hard surfaced air fields are available for take-off, and this limitation imposes serious restraints upon the tactical use of such aircraft. In an effort to solve the problem of getting aircraft into the air without large-size air fields, resort has been made to devices for catapulting aircraft into the air. However, insofar as I am aware such efforts have not met with a desired degree of success, primarily for the reason that previous catapults lack mobility and require permanent emplacement at launching locations. Furthermore, known catapults are generally complex in their construction and have a tendency toward malfunction due to such complexity.

The present invention is, accordingly, predicated on the concept of providing a completely mobile catapult of novel and relatively simple design. Basically, the invention contemplates the use of a motorized vehicle upon which a hydraulic jet gun is mounted and directed rearwardly with respect to the direction of forward vehicle movement. The jet gun is provided with a rearwardly directed nozzle and is preferably positioned at vehicle wheel height to minimize the moment of force reacting on the vehicle during hydraulic jetting from the gun. To resist vehicle displacement during such jetting, a series of supports preferably including ground engaging spades are attached to the vehicle for ground anchorage purposes during hydraulic jetting.

Further, and in reference to the mobile unit, a tow trailer is provided for connection to the motorized vehicle, and a number of portable track sections are removably mounted on the vehicle for transportation to the launching site. At such a location, the track sections are quickly removable from the tow trailer by an overhead crane pivotally mounted on the motorized vehicle. Thereafter, the track sections are readily assembled in end-to-end relation for connection to the rear of the vehicle to provide a highly integral launching assembly adapted to guide a jet-impelled carriage connected in catapulting relation with an aircraft.

Other features of the invention include the provision of pneumatic springs connected between the wheels of the motorized vehicle and its frame, the springs being deflatable to accomplish lowering of the frame onto the earth-engaging supports to emplace and anchor the vehicle at the launching site. Additionally, air pressure accumulators form the frame structure of the vehicle with the jet gun mounted therebetween. Finally, a water reservoir tank is conveniently carried by the trailer, water being led from the trough under the track assembly to the reservoir and from the reservoir to the jet gun by appropriate conduits.

Other features and objects of the invention together with the details of certain typical and preferred embodiments, will be more fully understood and to best advantage from the following description of the accompanying drawings, in which:

Fig. 1 is an elevation illustrating the mobile catapult assembly during transportation;

Fig. 2 is an elevation of the assembly as arranged during launching of an aircraft;

Fig. 3 is a longitudinal section in elevation of a portion of Fig. 3;

Fig. 4 is an enlarged elevation illustrating a portion of the assembly shown in Fig. 2;

Fig. 5 is an enlarged section taken on line 5—5 of Fig. 2;

Fig. 6 is a fragmentary perspective showing joined ends of two track sections;

Fig. 7 is a fragmentary perspective illustrating the pneumatic spring connection between the vehicle frame and its wheels; and Fig. 8 is an enlarged plan view taken on line 8—8 of Fig. 4.

Referring first to Fig. 1, the mobile hydraulic catapulting assembly is shown to comprise a motorized vehicle 10 including a cab 11 and a frame generally indicated at 12 to extend rearwardly from the cab and to which vehicle wheels 13 are mounted through pneumatic springs 14. Also mounted on the frame assembly directly to the rear of the cab and above the front wheels 13 is a lifting crane assembly 15 including a turntable 16 on which is mounted a support frame 17 and a swingable crane arm 18 reaching rearwardly beyond the rear end of the vehicle 10. Arm 18 is controllable in its vertical swinging movement by suitable cables 19 wound on a drum 20, the arm supporting an appropriate lifting cable 21 hanging downward from the outer end thereof for purposes as will be described.

The mobile assembly also includes a tow trailer generally indicated at 22 comprising an elongated frame 23 supported on front and rear wheels 24 between which a water reservoir tank 25 is positioned. Stacked on deck 26 formed on frame 23 and retained between side posts 27 fixedly attached to the frame are a number of portable track sections 28 for use in launching an aircraft, the sections being held against lateral movement by posts 27. The track sections are removably mounted on the trailer for transportation to a launching site, and are formed, as will be described, for quick assembly in end-to-end relation after removal from the trailer by the crane assembly 15. The trailer also includes a suitable forward connection 124 shown coupled to the rear of the motorized vehicle in Fig. 1, as during transportation of the complete mobile assembly.

Referring now to Figs. 3 and 4, the vehicle frame assembly 12 includes a platform 30 above which is mounted the vehicle engine 31 which drives the transmission and differential gear unit 32 and air compressor 33 located at the rear of the engine. The frame assembly also includes a pair of laterally spaced vertically extending cylinders 34 positioned between the front and rear vehicle wheels and connected between the upper platform 35 upon which turntable 16 is mounted and a pair of rearwardly extending, laterally spaced cylindrical shells 36, which comprise the air pressure accumulators used in connection with the operation of the jet gun 37. The accumulators in turn support cross-member 38 at the rear of the vehicle 10 and serve as longitudinal frame members for the vehicle. Jet gun 37 is positioned between the accumulators to extend rearwardly with respect to the direction of forward vehicle movement, the gun having a nozzle 40 projecting beyond cross-member 38 for jetting water rearwardly, as will be described.

The gun 37 comprises an elongated cylindrical shell supported near its nozzle end by transverse trunnions 41 connected to opposite sides of the shell and received within suitable openings 141 formed in cross-member 38, as shown in Fig. 8. For aiming purposes, the gun is swiveled on the trunnions in a vertical plane by a suitable jack screw 42 having one end connected to the jet gun shell through a bearing 43 and having a handle 44 connected to its free upper end. The jack screw threadedly engages a cross-piece 45 extending between the accumulators and supporting the weight of the jet gun, the screw being rotatable by the handle 44 to raise or lower the gun in the vertical plane. Lateral aiming of the gun is accomplished by directing vehicle 10 in the desired launching direction of the aircraft, as will be described.

Coming now to a description of the vehicle suspension system, the latter includes four pneumatic spring assemblies 14 connected between the vehicle wheels and the vehicle frame, as indicated in Figs. 1 to 3. A detailed showing of the spring assembly connected between a rear wheel 13 and one of the cylinders 36, as illustrated in Fig. 7, includes a curved plate 47 joined to the side of the cylinder and having laterally extending upper arm 48. Pivotally connected to the plate 47 beneath arm 48 is an A-frame 49, to the outer end of which a vertical cylinder 50 is connected. The latter contains a movable piston 51 shown in broken lines which is pivotally connected to the outer end of arm 48 by vertical rod 52 extending through the upper end of the cylinder. The latter also includes an air pressure chamber below the piston and into which line 53 is connected for supplying compressed air to the chamber. Rear wheel 13 is mounted on an axle 54 rigidly joined to the cylinder 50 for vertical movement therewith upon pivoting of the A-frame relative to accumulator shell 36.

Air pressure conducted from accumulators 36 through lines 53 and control valves 55 to the air pressure cylinders 50, as shown in Figs. 4 and 7, operates to lift the vehicle frame represented by the accumulator tanks 36 with respect to the vehicle wheels 13 during vehicle transportation. Under these conditions, valves 55 are normally closed, and the compressed air contained within each cylinder 50 operates as a cushion or pneumatic spring. Upon reaching the launching site and after maneuvering the vehicle so as to direct the jet gun 37 for aircraft launching, the pneumatic springs are deflated to aid in emplacing the vehicle in position, as will be described.

As shown in Figs. 1, 2 and 4, the vertical cylinders 34 hinged to the frame contain vertically movable pistons 56 which project from the cylinders in a downward direction for connection to L-shaped spades 57. The latter are also hinge connected to angled links or trails 58, the forward ends of which are apertured and pivotally mounted on the trunnions 41 of the jet gun. Another spade or support 57 is positioned beneath cab 11 of the vehicle and mounted beneath piston 56 vertically movable within another cylinder 34. Each of the L-shaped spades comprises a horizontal plate 57a for engagement with the surface 58 of the earth in supporting relation to the vehicle and a vertical plate 57b projecting below the horizontal plate for earth penetration to resist jet gun reaction. When the motorized vehicle 10 is positioned for emplacement, the pneumatic springs 14 are deflated to lower the vehicle frame relative to the wheels 13. Thereafter, air pressure is supplied from the accumulators through valves 134 and lines 135 to cylinders 34 moving pistons 56 downward to force plates 57b of the spades into the ground so that horizontal plates 57a rest on the ground surface. Further displacement of the pistons 56 relative to the cylinders 34 transfers the weight of the vehicle off wheels 13 and onto the spades for firm emplacement.

After removal from tow trailer 22 by crane 15, the individual track sections 28 are connected in end-to-end relation as shown in Figs. 2, 4, 5 and 6. Each of the sections comprises a pair of longitudinally extending outer plates 59 and inner plates 60 connected to the U-shaped trough 61 and diverging upwardly to form an elongated upwardly opening chamber 62 between plates 60. For retaining the plates in end-to-end relation, lateral supports 63 are joined to the ends of the track sections at the outer sides of the plates 59, the supports providing mutual abutment surfaces and supporting pins 64 receivable through openings formed by curved eye-brackets 65, the pins 64 and eye-brackets 65 being connected respectively to abutting supports 63, as shown in Fig. 6. In addition, the tracks are held in tightly connected condition by three cables 66 strung endwise through the track sections as shown in Fig. 5, as by running them through the trough chamber and through the gaps between plates 59 and 60. One end of each cable is connected to a fastener 67 at the outermost track section, and its opposite end is joined to a movable plunger 68 received within an air pressure cylinder 69. For tensioning the cables, cylinders 69 are mounted on cross-piece 38, as shown in Fig. 4, and are supplied with compressed air through lines 70. The end-to-end connected track sections 28 are held in spaced position above the ground at the desired angle relative thereto by adjustable supports 71 spaced at intervals beneath the sections and by lateral tie wires connected between plates 59 of the track sections and ground engaging stakes 73. In addition, the forward end 74 of the track section immediately to the rear of the jet gun abuts cross-piece 38 and is received between laterally spaced supports 75 and above a bottom support 76 connected to the cross-piece 38.

Referring now to Figs. 2 and 5, each of the track sections supports a pair of elongated channels 77 joined to the upper opposite sides of the section and facing one another across chamber 62. When the track sections are connected together in end-to-end relation, channels 77 define elongated tracks for guiding a movable carriage indicated at 78 in the launching direction. The carriage essentially comprises a hollow tube 79 having a jet receiving bucket 80 integrally formed at its forward end for receiving a liquid jet through the tube and for turning the jet downward into the trough 61. The tube 79 supports forward and rearward cross-members 81 carrying rollers 82 guided in the channels 77, so that the tube is movable longitudinally within chamber 62 during launching. Each of the cross-members 81 also carries a pair of vertical supports 83 for supporting an aircraft 84 during launching, thrust being transmitted to the aircraft through a strap 85 looped around the nose of the bucket 80 and through cables 86 connected between the strap and the aircraft.

When the mobile assembly is emplaced at a launching site in readiness for launching an aircraft, water is charged into the jet gun by pump 187 connected into a conduit 87 running from the supply tank 25 in the trailer to an inlet opening in the gun adjacent the nozzle 40, pump 187 being mounted on vehicle 10. Air pressure is supplied from the accumulators 36 to the end of the gun opposite the nozzle through a line 88, pressure having been previously supplied to the accumulators from the compressor 33 through line 89 as shown in Fig. 4. The air pressure delivered to the jet gun operates to effect jetting of water therefrom through nozzle 40 with sufficient velocity to travel through chambers 62 in the track sections and for impact against the bucket 80 without substantial vertical deviation relative to the track sections. Since the latter are angled in an upward direction away from the motorized vehicle, water is returned by gravity flow to the end of the trough adjacent the vehicle, and thereafter conducted through drain 90 and conduit 91 to the trailer as by a suitable pump 92 inserted in the line 91.

Operation of the crane assembly 15 for unloading the track sections and for lifting aircraft onto the forward end of the track sections during launching is controlled by hydraulic motors 93 and 94, respectively operating turn-table 16 and drum 20. The motors are driven by hydraulic fluid conducted to the motors through suitable lines 95 running from hydraulic pump 96 operated off the gear box 32.

Having in mind the above described features of the invention, a typical cycle of operation will now be described. After movement to a launching site in the configuration shown in Fig. 1, the mobile catapult assembly is readily arranged for a launching operation as follows: first, the vehicle 10 and trailer are maneuvered for movement in the direction of desired launching, and the track sections are individually removed from the trailer by the crane 15 as the vehicle tows the trailer in that direction, the track sections being laid in approximately end-to-end relation on the ground. Next, the track sections are quickly slipped together in end-to-end relation and the motorized vehicle is emplaced in position at the end of the track sections, as by lowering the spades 57 and deflating the pneumatic springs. The end track section is then connected in abutting position at the rear of the vehicle and the cables 66 are drawn taut by retraction of plungers 68 into cylinders 69. To complete the setting up of the assembly, the elongated track is elevated to the correct inclination by means of adjustable supports 71, and the guy wires 72 are positioned to hold the track in rigid alignment for launching purposes. The jet gun 37 is then aimed for jet discharge through the track sections.

A typical catapulting operation involves use of crane 15 to place the aircraft 84 on the carriage assembly 78 directly to the rear of the vehicle, while the jet gun is being filled with water. Next, air pressure is admitted to the gun, and at the appropriate launching time, the nozzle 40 is opened to permit jetting of the water from the gun under the influence of air pressure behind the water. The high-pressure jet aimed at the carriage assembly travels centrally through tube 79 and impacts against the impulse bucket 80. Thrust transmitted to the bucket is transmitted to the aircraft through cables 86, and the carriage assembly and aircraft rapidly accelerate along the track to launching velocity, at which time the aircraft leaves the track assembly and the latter is suitably braked or may alternatively leave the end of the track assembly. Since the motorized vehicle is anchored to the ground by spades 57, reaction thrust developed at the jet gun cannot move or overturn the vehicle, the thrust being transmitted directly from the jet gun trunnions to the spades through links 58.

After launching of one or more aircraft is completed, the emplaced assembly may be rapidly disconnected for removal from the launching site by the reverse order of steps recited above.

I claim:

1. Mobile apparatus for catapulting an aircraft, comprising an assembly including a motorized vehicle frame, a hydraulic jet gun and means connecting said gun to a rear portion of the vehicle frame for jetting liquid rearwardly with respect to the direction of forward vehicle movement, means carried by said vehicle frame for charging said gun with liquid and for supplying pressure to liquid in said gun during liquid jetting therefrom, a support forward of said connecting means movable downwardly into the ground to resist forward assembly displacement and adapted to be retracted upwardly away from the ground to permit said displacement, and a connection between said support and a portion of the assembly rearwardly of the support adapted to transmit jet reaction thrust forwardly from said assembly portion to said support for transfer to the ground during liquid jetting from said gun.

2. Mobile apparatus for catapulting an aircraft, comprising an assembly including a motorized wheeled vehicle frame, a hydraulic jet gun and means connecting said gun to a rear portion of the vehicle frame substantially at wheel elevation for jetting liquid rearwardly with respect to the direction of forward vehicle movement, means carried by said vehicle frame for charging said gun with liquid and for supplying pressure to liquid in said gun during liquid jetting therefrom, a support forward of said connecting means movable downwardly into the ground to resist forward assembly displacement and adapted to be retracted upwardly away from the ground to permit said displacement, and a connection between said support and a portion of the assembly rearwardly of the support adapted to transmit jet reaction thrust forwardly from said assembly portion to said support for transfer to the ground during liquid jetting from said gun.

3. Mobile apparatus for catapulting an aircraft comprising an assembly including a motorized vehicle frame, a hydraulic jet gun and means connecting said gun to a rear portion of the vehicle frame for jetting liquid rearwardly with respect to the direction of forward vehicle movement, means carried by said vehicle frame including a water pump and an air pressure accumulator for charging water into said gun and for supplying air pressure thereto during liquid jetting therefrom, a support forward of said connecting means movable downwardly into the ground to resist forward assembly displacement and adapted to be retracted upwardly away from the ground to permit said displacement, and a connection between said support and a portion of the assembly rearwardly of the support adapted to transmit jet reaction thrust forwardly from said assembly portion to said support for transfer to the ground during liquid jetting from said gun.

4. Mobile apparatus for catapulting an aircraft, comprising an assembly including a motorized vehicle frame, a hydraulic jet gun and means connecting said gun to a rear portion of the vehicle frame for jetting liquid rearwardly with respect to the direction of forward vehicle movement, means carried by said vehicle frame including a water pump, an air compressor and an air pressure accumulator for charging water into said gun and for supplying air pressure thereto during liquid jetting therefrom, a support forward of said connecting means movable downwardly into the ground to resist forward assembly displacement and adapted to be retracted upwardly away from the ground to permit said displacement and a connection between said support and a portion of the assembly rearwardly of the support adapted to transmit jet reaction thrust forwardly from said assembly portion to said support for transfer to the ground during liquid jetting from said gun.

5. Mobile apparatus for catapulting an aircraft, comprising an assembly including a motorized wheeled vehicle frame, a hydraulic jet gun having a nozzle and means connecting said gun to a rear portion of the frame substantially at vehicle wheel elevation with said nozzle directed rearwardly with respect to the direction of forward vehicle movement, means carried by said vehicle frame including a water pump, an air compressor and an air pressure accumulator for charging water into said gun and for supplying air pressure thereto to force water from said nozzle in a high velocity jet stream, a plurality of supports forward of said connecting means movable downwardly into the ground to resist forward assembly displacement and adapted to be retracted upwardly away from the ground to permit said displacement, and connections between said supports and a portion of the assembly rearwardly of the support adapted to transmit jet reaction thrust forwardly from said assembly portion to said supports for transfer to the ground during liquid jetting from said gun.

6. Mobile hydraulic catapulting apparatus comprising an assembly including a motorized wheeled vehicle frame, a hydraulic jet gun having a nozzle and means connecting said gun to a rear portion of the frame substantially at vehicle wheel elevation with said nozzle directed rearwardly with respect to the direction of forward vehicle movement, means carried by said vehicle frame including a water pump for charging water into said gun and an air pressure accumulator for supplying air pressure to said gun during hydraulic jetting from said nozzle, a support forward from said connecting means movable downwardly into the ground to resist forward assembly displacement and adapted to be retracted upwardly away from the ground to permit said displacement a connection between said support and a portion of said assembly rearwardly of the support adapted to transmit jet reaction thrust forwardly from said assembly portion to said support for transfer to the ground during liquid jetting from said nozzle, an elongated guide track assembly including a plurality of track sections secured in end-to-end relation for guiding a jet impelled carriage in catapulting relation with an aircraft, and a connection between the rear of said frame and one end of said track assembly positioning said track assembly to the rear of said vehicle frame with said track assembly extending rearwardly from said jet gun nozzle.

7. The invention as defined in claim 6 including a taut cable holding the end of said track assembly rigidly against said frame.

8. The invention as defined in claim 7 in which said cable extends through and holds said track sections in rigid end-to-end relation.

9. The invention as defined in claim 5 comprising a pair of elongated accumulator shells disposed in laterally spaced relation on opposite sides of said gun and forming longitudinally extending portions of said frame, and duct means connecting said accumulators with said gun.

10. The invention as defined in claim 5 including pneumatic springs operatively connected between said frame and the vehicle wheels, said springs being deflatable for lowering said frame relative to said wheels so as to transfer the weight of said vehicle onto said supports.

11. The invention as defined in claim 5 including a connection at the rear of said frame for retaining the end portion of a launching track extending rearwardly from said vehicle substantially in the direction of said nozzle.

12. Mobile hydraulic catapulting apparatus, comprising an assembly including a motorized vehicle frame, a hydraulic jet gun and means connecting said gun to a rear portion of the vehicle frame for jetting liquid rearwardly with respect to the direction of forward vehicle movement, means carried by said vehicle frame for charging said gun with liquid and for supplying pressure to liquid in said gun during liquid jetting therefrom, a tow trailer connected to the rear of said vehicle frame, and a plurality of portable guide track sections removably mounted on said trailer for transportation to a launching site, said sections being adapted after removal from said trailer for assembly in end-to-end relation rearward of said jet gun for guiding a jet impelled carriage assembly in catapulting relation with an aircraft.

13. The invention as defined in claim 12 including a liquid reservoir carried by said trailer from which liquid may be drawn for charging into said gun.

14. The invention as defined in claim 12 including an overhead crane pivotally mounted on said vehicle frame and adapted for unloading said track sections from the tow trailer.

References Cited in the file of this patent

UNITED STATES PATENTS

| | | |
|---|---|---|
| 2,292,374 | Hagenbuch | Aug. 11, 1942 |
| 2,481,821 | Byrne | Sept. 13, 1949 |
| 2,703,112 | Fuchs | Mar. 1, 1955 |
| 2,728,583 | Tucker | Dec. 27, 1955 |
| 2,729,406 | Bush | Jan. 3, 1956 |
| 2,737,357 | Ringleb | Mar. 6, 1956 |